(12) United States Patent
Moniz et al.

(10) Patent No.: US 7,493,754 B2
(45) Date of Patent: Feb. 24, 2009

(54) GAS TURBINE ENGINE ASSEMBLY AND METHODS OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 11/254,018

(22) Filed: Oct. 19, 2005

(65) Prior Publication Data

US 2007/0084190 A1    Apr. 19, 2007

(51) Int. Cl.
*F02K 3/00* (2006.01)

(52) U.S. Cl. .................. 60/268; 60/226.1; 60/39.162; 415/9

(58) Field of Classification Search ............ 60/228, 60/226.1, 39.162; 415/9, 174.4; 416/2
See application file for complete search history.

(56) References Cited

U.S. PATENT DOCUMENTS

| | | | | |
|---|---|---|---|---|
| 3,866,415 | A | * | 2/1975 | Ciokajlo ............... 60/226.1 |
| 3,922,852 | A | * | 12/1975 | Drabek ................ 60/226.1 |
| 4,744,214 | A | * | 5/1988 | Monsarrat et al. ......... 60/226.1 |
| 4,751,816 | A | * | 6/1988 | Perry ................. 60/226.1 |
| 4,969,325 | A | * | 11/1990 | Adamson et al. .......... 60/226.1 |
| 5,010,729 | A | * | 4/1991 | Adamson et al. .......... 60/226.1 |
| 5,394,967 | A | * | 3/1995 | Bigley ................. 192/69.4 |
| 5,806,303 | A | | 9/1998 | Johnson |
| 5,809,772 | A | | 9/1998 | Giffin, III et al. |
| 5,813,214 | A | | 9/1998 | Moniz et al. |
| 5,867,980 | A | | 2/1999 | Bartos |
| 6,158,210 | A | * | 12/2000 | Orlando ............... 60/226.1 |
| 6,619,030 | B1 | | 9/2003 | Seda et al. |
| 6,684,626 | B1 | | 2/2004 | Orlando et al. |
| 6,711,887 | B2 | | 3/2004 | Orlando et al. |
| 6,732,502 | B2 | | 5/2004 | Seda et al. |
| 6,739,120 | B2 | | 5/2004 | Moniz et al. |
| 6,763,652 | B2 | | 7/2004 | Baughman et al. |
| 6,763,653 | B2 | | 7/2004 | Orlando et al. |
| 6,763,654 | B2 | | 7/2004 | Orlando et al. |
| 2007/0084183 | A1 | * | 4/2007 | Moniz et al. .......... 60/204 |
| 2007/0084185 | A1 | * | 4/2007 | Moniz et al. .......... 60/204 |
| 2007/0084187 | A1 | * | 4/2007 | Moniz et al. .......... 60/204 |
| 2007/0084189 | A1 | * | 4/2007 | Moniz et al. .......... 60/204 |
| 2007/0240399 | A1 | * | 10/2007 | Orlando et al. ......... 60/39.162 |
| 2008/0098716 | A1 | * | 5/2008 | Orlando et al. ......... 60/226.1 |
| 2008/0148707 | A1 | * | 6/2008 | Schilling ............. 60/39.162 |

* cited by examiner

*Primary Examiner*—William H Rodríguez
(74) *Attorney, Agent, or Firm*—William Scott Andes, Esq.; Armstrong Teasdale LLP

(57) ABSTRACT

A method for assembling a gas turbine engine including providing a core gas turbine engine at least partially defined by a frame and having a drive shaft rotatable about a longitudinal axis of the core gas turbine engine. A low-pressure turbine is coupled to a core turbine engine. A counter-rotating fan assembly is coupled to the low-pressure turbine. The counter-rotating fan assembly includes a first fan assembly and a second fan assembly. A booster compressor is coupled to the second fan assembly. A gearbox is securely coupled to the frame so that the gearbox is circumferentially positioned about the drive shaft. The first fan assembly is rotatably coupled to an input of the gearbox such that the first fan assembly rotates in a first direction. The second fan assembly is rotatably coupled to an output of the gearbox such that the second fan assembly rotates in a second direction opposite the first direction.

19 Claims, 4 Drawing Sheets

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned forward of the high-pressure turbine. The low-pressure turbine includes a rotor assembly having a fan coupled to a drive shaft. The low-pressure turbine rotatably drives the fan through the drive shaft. To facilitate increasing engine efficiency, at least one known gas turbine engine includes a counter-rotating low-pressure turbine that is coupled to a counter-rotating fan and/or a counter-rotating booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. Accordingly, the overall weight, design complexity and/or manufacturing costs of such an engine are increased.

BRIEF DESCRIPTION OF THE INVENTION

In one embodiment, the present invention provides a method for assembling a gas turbine engine. The method includes providing a core gas turbine engine at least partially defined by a frame and having a drive shaft rotatable about a longitudinal axis of the core gas turbine engine. A low-pressure turbine is coupled to a core turbine engine. A counter-rotating fan assembly including a first fan assembly and a second fan assembly is coupled to the low-pressure turbine. A booster compressor is coupled to the second fan assembly. A gearbox is securely coupled to the frame so that the gearbox is circumferentially positioned about the drive shaft. The first fan assembly is rotatably mounted to an input of the gearbox such that the first fan assembly rotates in a first direction. The second fan assembly is rotatably coupled to an output of the gearbox such that the second fan assembly rotates in a second direction opposite the first direction.

In another embodiment, a spline system for operatively coupling a gearbox to a counter-rotating fan assembly is provided. The spline system includes a first spline assembly coupling an input of said gearbox to a bearing support structure. A second spline assembly slidably couples a first portion of the bearing support structure to a second portion of the bearing support structure. A third spline assembly slidably couples an output of the gearbox to an output structure. The spline system isolates the gearbox from axial loads generated by the counter-rotating fan assembly.

In a further embodiment, a turbine engine assembly is provided. The turbine engine assembly includes a core turbine engine at least partially defined by a frame and having a drive shaft rotatable about a longitudinal axis of the core turbine engine. A low-pressure turbine is coupled to the core turbine engine. A gearbox is securely coupled with respect to the low-pressure turbine. A first fan assembly is coupled to an input of the gearbox. The first fan assembly is rotatable in a first rotational direction. A second fan assembly is coupled to an output of the gearbox. The second fan assembly is rotatable in a second rotational direction opposite said first direction. A spline system isolates the gearbox from axial loads generated by at least one of the first fan assembly and the second fan assembly.

DETAILED DESCRIPTION OF THE INVENTION

Figure 1:
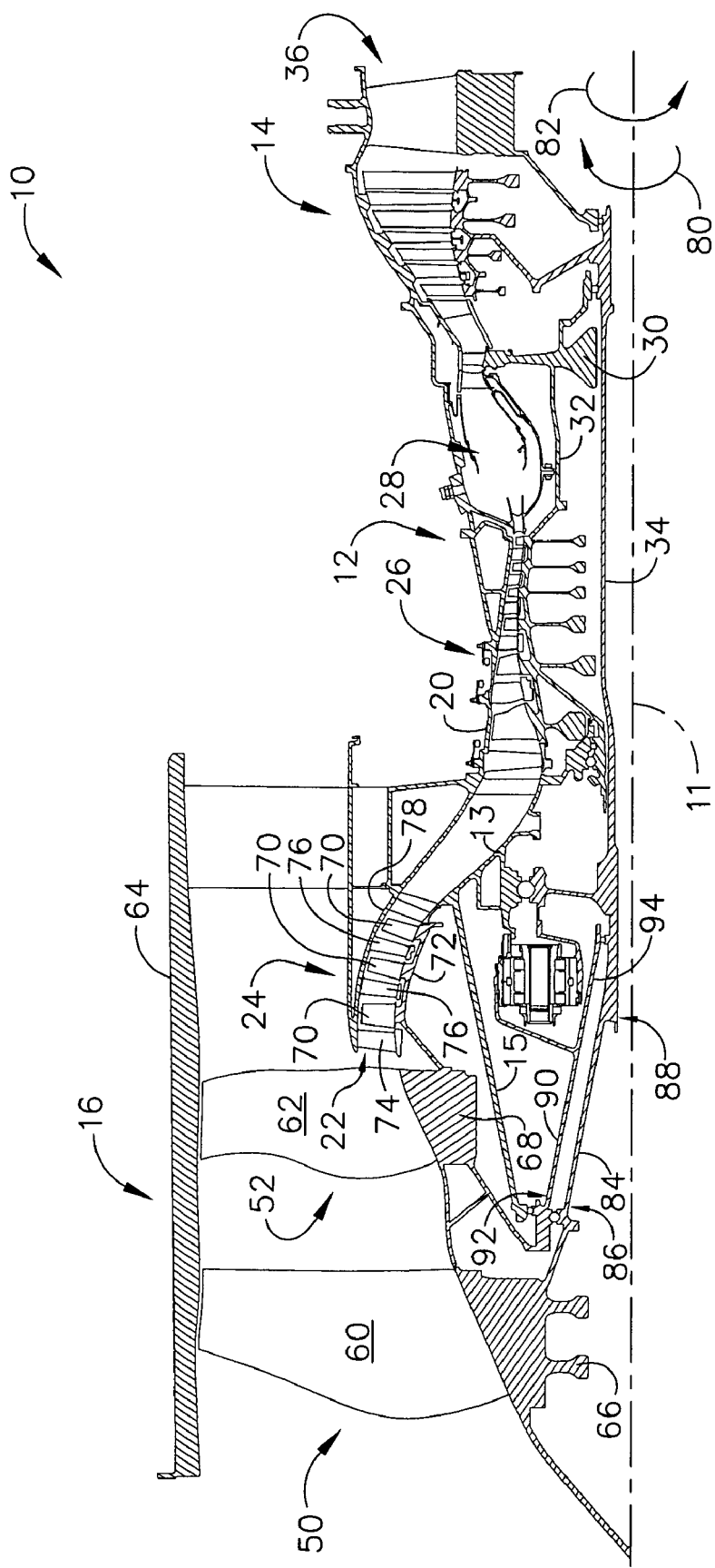
FIG. 1 is a cross-sectional view of a portion of an exemplary turbine engine assembly.

FIG. 1 is a cross-sectional view of a portion of an exemplary turbine engine assembly 10 having a longitudinal axis 11. In the exemplary embodiment, turbine engine assembly 10 includes a core gas turbine engine 12 generally defined by a frame 13. A low-pressure turbine 14 is coupled axially aft of core gas turbine engine 12 and a counter-rotating fan assembly 16 is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, core gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first rotatable drive shaft 32, and then to second or low-pressure turbine 14 to facilitate driving counter-rotating fan assembly 16 and booster compressor 24 through a second rotatable drive shaft 34 that is coupled coaxially with first drive shaft 32. After driving low-pressure turbine 14, the combustion products leave turbine engine assembly 10 through an exhaust nozzle 36 to provide propulsive jet thrust.

Figure 2:
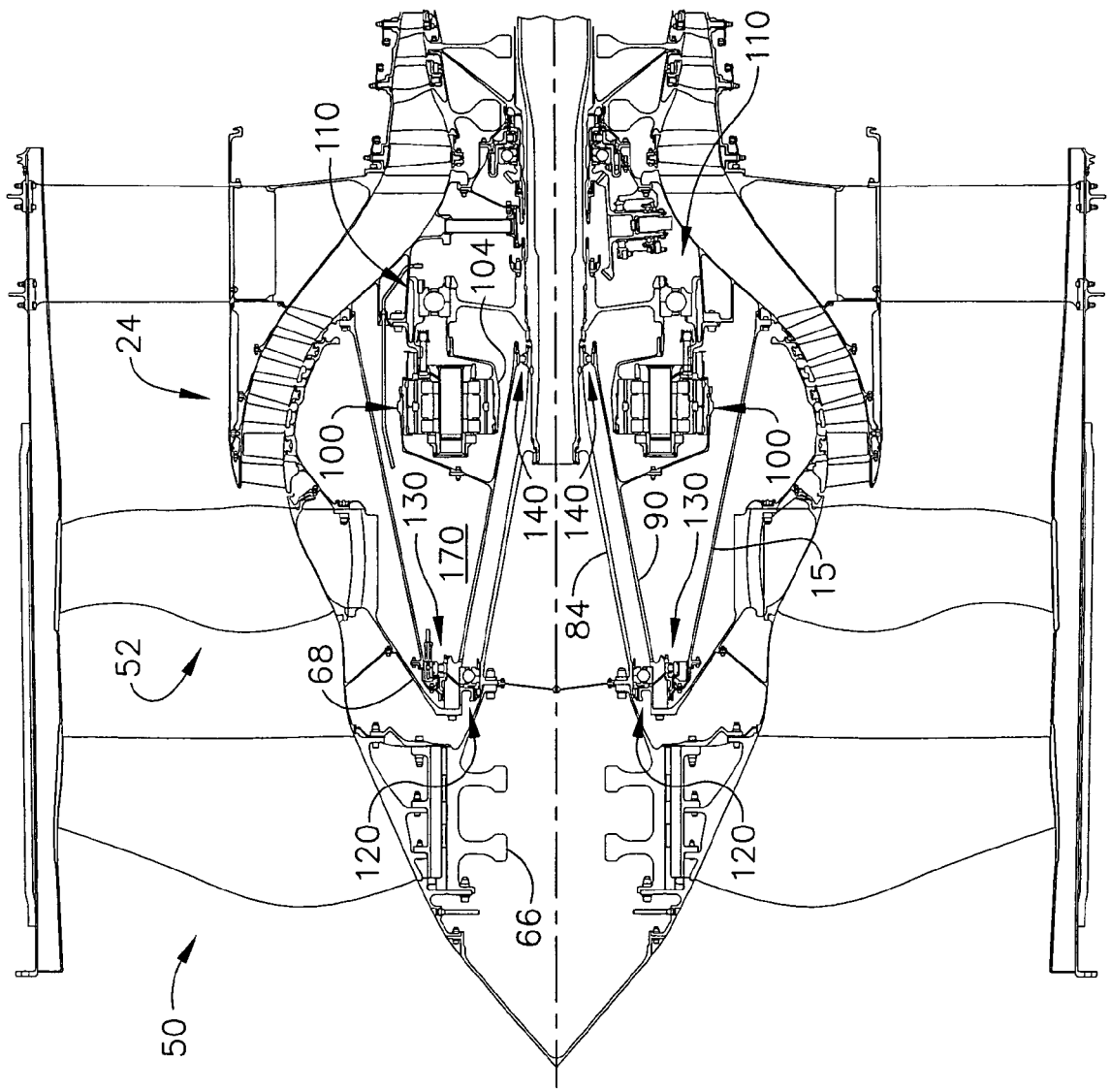
FIG. 2 is an enlarged cross-sectional view of a portion of a counter-rotating fan assembly shown in FIG. 1.
Figure 3:
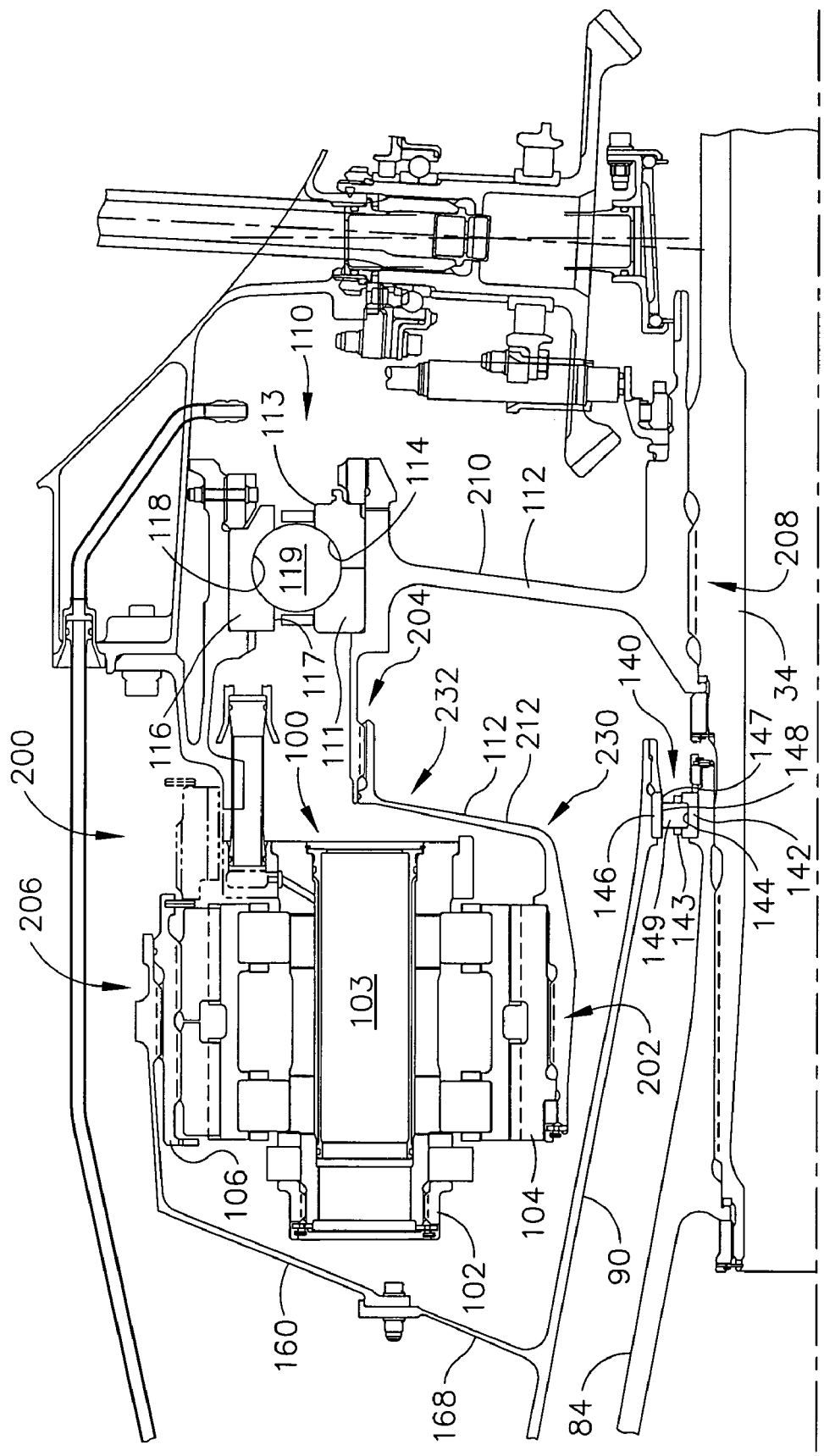
FIG. 3 is an enlarged cross-sectional view of a portion of the counter-rotating fan assembly shown in FIG. 2.

Counter-rotating fan assembly 16 includes a first or forward fan assembly 50 and a second or an aft fan assembly 52 configured to rotate about longitudinal axis 11. The terms "forward fan" and "aft fan" are used herein to indicate that fan assembly 50 is coupled axially upstream from fan assembly 52. In one embodiment, fan assemblies 50 and 52 are positioned at a forward end of core gas turbine engine 12, as shown in FIGS. 1-3. In an alternative embodiment, fan assemblies 50 and 52 are positioned at an aft end of core gas turbine engine 12. Fan assemblies 50 and 52 each includes at least one row of rotor blades 60 and 62, respectively, and are positioned within a nacelle 64. Rotor blades 60 are coupled to rotor disk 66 and rotor blades 62 are coupled to rotor disk 68.

In one embodiment, booster compressor 24 includes a plurality of rows of rotor blades 70 that are coupled to a respective rotor disk 72. Booster compressor 24 is positioned aft of an inlet guide vane assembly 74 and is coupled to aft fan assembly 52 such that booster compressor 24 rotates at a rotational speed that is substantially equal to a rotational speed of aft fan assembly 52. Although booster compressor 24 is shown as having only three rows of rotor blades 70, booster compressor 24 may have any suitable number and/or rows of rotor blades 70, such as a single row of rotor blades 70 or a plurality of rows of rotor blades 70 that are interdigitated with a plurality of rows of guide vanes 76. In one embodiment, inlet guide vanes 76 are fixedly or securely coupled to a booster case 78. In an alternative embodiment, rotor blades 70 are rotatably coupled to rotor disk 72 such that inlet guide vanes 76 are movable during engine operation to facilitate varying a quantity of air channeled through booster compressor 24. In another alternative embodiment, turbine engine assembly 10 does not include booster compressor 24.

As shown in FIG. 1, low-pressure turbine 14 is coupled to forward fan assembly 50 through shaft 34 such that forward fan assembly 50 rotates in a first rotational direction 80. Aft fan assembly 52 is coupled to drive shaft 34 and/or low-pressure turbine 14 such that aft fan assembly 52 rotates in an opposite second rotational direction 82.

FIG. 2 is a schematic diagram of a portion of counter-rotating fan assembly 16 shown in FIG. 1. In one embodiment, first fan assembly 50 includes a cone 84 positioned about longitudinal axis 11. Cone 84 is connected at a first or forward end 86 to rotor disk 66 and at a second or aft end 88 to drive shaft 34, as shown in FIG. 2. Second fan assembly 52 includes a cone 90 positioned coaxially about at least a portion of cone 84 along longitudinal axis 11. Cone 90 is coupled at a first or forward end 92 to rotor disk 68 and at a second or aft end 94 to an output of a gearbox 100 and/or to aft end 88 of cone 84 via a rolling bearing assembly, as described in greater detailed below.

FIG. 3 is a schematic diagram of a portion of the counter-rotating fan assembly 16 shown in FIG. 2. In one embodiment, counter-rotating fan assembly 16 also includes a gearbox 100 that is coupled between aft fan assembly 52 and drive shaft 34 to facilitate rotating aft fan assembly 52 in opposite rotational direction 82 with respect to rotational direction 80 in which forward fan assembly 50 rotates. Gearbox 100 has a generally toroidal shape and is configured to be positioned circumferentially about drive shaft 34 to extend substantially about drive shaft 34. As shown in FIG. 3, gearbox 100 includes a support structure 102, at least one gear 103 coupled within support structure 102, an input 104 and an output 106.

In one embodiment, gearbox 100 has a gear ratio of approximately 2.0 to 1 such that forward fan assembly 50 rotates at a rotational speed that is approximately twice the rotational speed of aft fan assembly 52. In another embodiment, forward fan assembly 50 rotates with a rotational speed that is between approximately 0.67 and approximately 2.1 times faster than the rotational speed of aft fan assembly 52. In this embodiment, forward fan assembly 50 may rotate at a rotational speed greater than, equal to or less than the rotational speed of aft fan assembly 52.

In one embodiment, a first bearing assembly, such as thrust bearing assembly 110 as shown in FIGS. 1-3, is positioned about drive shaft 34 and/or longitudinal axis 11. Thrust bearing assembly 110 operatively couples and/or is mounted between drive shaft 34 and frame 13 of core gas turbine engine 12. Referring further to FIG. 3, in one embodiment, thrust bearing assembly 110 includes a radially positioned inner race 111 that is mounted with respect to drive shaft 34. As shown in FIG. 3, inner race 111 is mounted to a drive shaft extension 112 operatively coupled to drive shaft 34 so that inner race 111 is rotatable about longitudinal axis 11 with drive shaft 34. In one particular embodiment, drive shaft extension 112 is splined to drive shaft 34. Inner race 111 has a surface 113 defining an inner groove 114 of thrust bearing assembly 110. Surface 113 defining inner groove 114 has a generally arcuate profile.

Thrust bearing assembly 110 includes a radially positioned outer race 116 securely coupled to frame 13. In one embodiment, outer race 116 and/or frame 13 acts as a ground for the transfer of thrust loads and/or forces developed or generated by counter-rotating fan assembly 16 and/or booster compressor 24, as discussed in greater detail below. Outer race 116 has a surface 117, generally opposing surface 113, which forms an outer groove 118 of thrust bearing assembly 110. Surface 117 defining outer groove 118 has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to gearbox 100.

Figure 4:
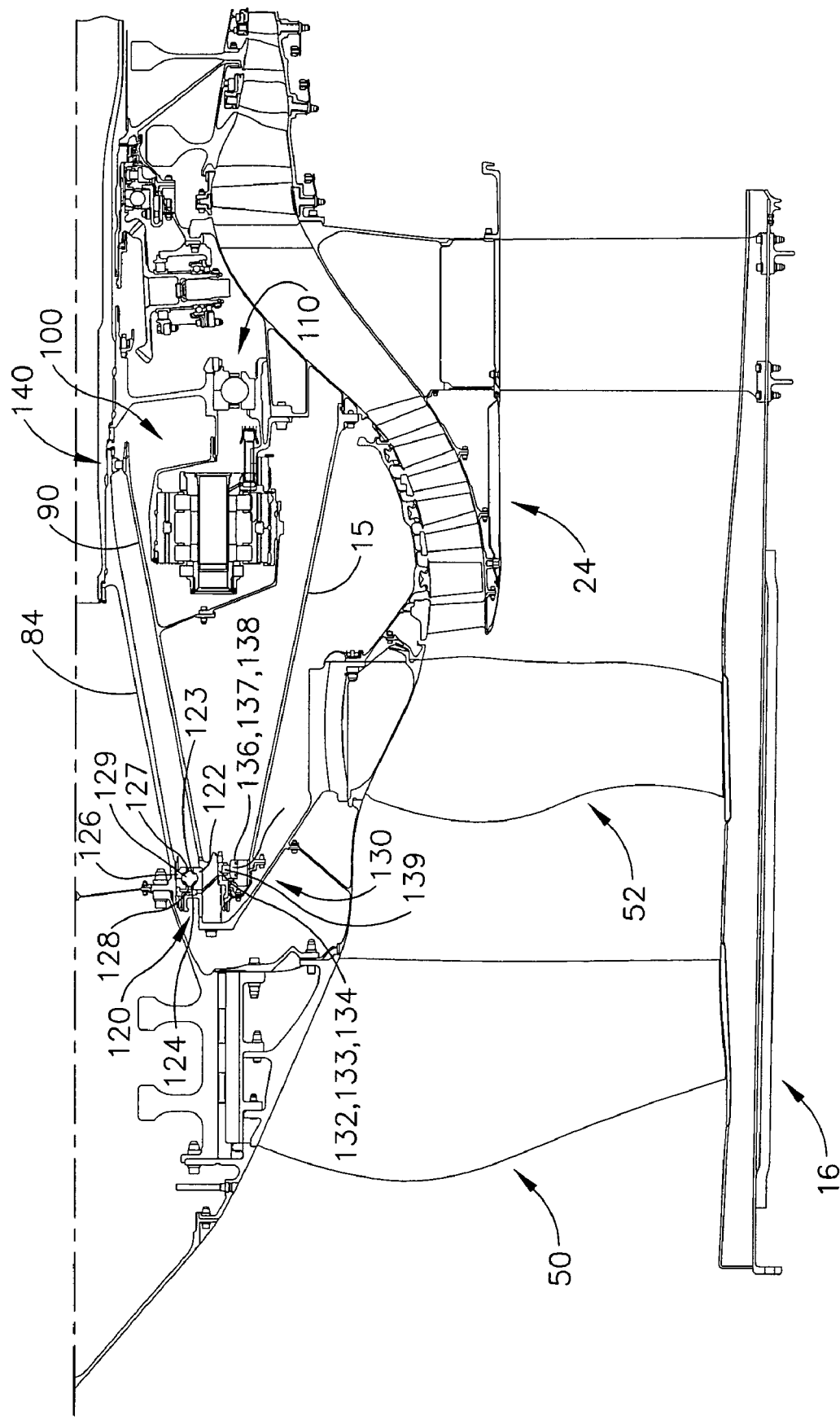
FIG. 4 is an enlarged cross-sectional view of a portion of the counter-rotating fan assembly shown in FIG. 2.

Referring to FIG. 4, a second bearing assembly, such as thrust bearing assembly 120, is positioned radially about longitudinal axis 11. In one embodiment, thrust bearing assembly 120 operatively couples and/or is mounted between a forward end portion of first fan assembly 50, such as at or near forward end 86 of cone 84, and a forward end portion of second fan assembly 52, such as at or near forward end 92 of cone 90. In one embodiment, thrust bearing assembly 120 includes a radially positioned inner race 122 that is mounted with respect to an outer surface of cone 84. As shown in FIG. 4, inner race 122 is mounted to cone 84 so that inner race 122 is rotatable about longitudinal axis 11 with first fan assembly 50. Inner race 122 has a surface 123 defining an inner groove 124 of thrust bearing assembly 110. Surface 123 defining inner groove 124 has a generally arcuate profile.

Thrust bearing assembly 120 includes a radially positioned outer race 126 that is mounted with respect to an inner surface of cone 90. As shown in FIG. 4, inner race 122 is mounted to cone 90 so that outer race 126 is rotatable about longitudinal axis 11 with second fan assembly 52. Outer race 126 has a surface 127, generally opposing surface 123, which forms an outer groove 128 of thrust bearing assembly 120. Surface 127 defining outer groove 128 has a generally arcuate profile. At least one roller element, such as a plurality of bearings 129, is movably positioned between inner race 122 and outer race 126. Each bearing 129 is in rolling contact with inner groove 124 and outer groove 128 to facilitate relative rotational movement of first fan assembly 50 and/or second fan assembly 52.

In one embodiment, thrust bearing assemblies 110 and/or 120 facilitate maintaining forward fan assembly 50 and/or aft fan assembly 52 in a relatively fixed axial position. During operation of counter-rotating fan assembly 16, thrust loads and/or forces generated by first fan assembly 50 are transferred directly from first fan assembly 50 to first thrust bearing assembly 110. Further, thrust loads and/or forces generated by second fan assembly 52 and/or booster compressor 24 during operation are transferred from second fan assembly 52 and/or booster compressor 24 to second thrust bearing assembly 120 and from second thrust bearing assembly 120 through drive shaft 34 to first thrust bearing assembly 110. As a result of transferring thrust loads and/or forces to thrust bearing assembly 110 and/or thrust bearing assembly 120, the transfer of thrust loads and/or forces through gearbox 100, operatively coupled to second fan assembly 52, is prevented or limited. In alternative embodiments, any suitable bearing assembly known to those skilled in the art and guided by the teachings herein provided can be used for or in addition to bearing assembly 110 and/or bearing assembly 120.

In one embodiment, a bearing assembly, such as roller bearing assembly 130, is positioned about the outer surface of cone 90 at or near forward end 92, as shown in FIG. 4. Roller bearing assembly 130 is connected between frame 13 and forward end 92. In one embodiment, roller bearing assembly 130 acts as a differential bearing assembly in combination with thrust bearing assembly 120 to support second fan assembly 52 and/or transfer thrust loads and/or forces from second fan assembly 52 to frame 13. In one embodiment, roller bearing assembly 130 includes an inner race 132 that is mounted with respect to cone 90, as shown in FIG. 4. Inner race 132 is mounted to forward end 92 of cone 90 so that inner race 132 is rotatable about longitudinal axis 11 with second fan assembly 52. Inner race 132 has a surface 133 defining an inner groove 134 of roller bearing assembly 130.

Roller bearing assembly 130 includes an outer race 136 that is securely coupled to frame 13. In one embodiment, outer race 136 is securely coupled with respect to structural support member 15 and/or frame 13. Structural support member 15 and/or frame 13 acts as a ground for the transfer of thrust loads and/or forces developed or generated by counter-rotating fan assembly 16 and/or booster compressor 24. Outer race 136 has a surface 137, generally opposing surface 133, which forms an outer groove 138 of roller bearing assembly 130. At least one roller element, such as a plurality of rollers 139, is movably positioned between inner race 132 and outer race 136. Each roller 139 is in rolling contact with inner groove 134 and outer groove 138.

In one embodiment, a bearing assembly, such as roller bearing assembly 140, is positioned about the outer surface of cone 84 at or near aft end 88, as shown in FIG. 3. Roller bearing assembly 140 is connected between cone 84 and cone 90. Roller bearing assembly 140 includes an inner race 142 that is mounted with respect to aft end 88, as shown in FIG. 2. Inner race 142 is mounted to cone 84 so that inner race 142 is rotatable about longitudinal axis 11 with first fan assembly 50. Inner race 142 has a surface 143 defining an inner groove 144 of roller bearing assembly 140.

Roller bearing assembly 140 includes an outer race 146 that is mounted with respect to aft end 94 of cone 90, as shown in FIG. 3. Outer race 146 is mounted to cone 90 so that outer race 146 is rotatable about longitudinal axis 11 with second fan assembly 52. Outer race 146 has a surface 147, generally opposing surface 143, which forms an outer groove 148 of roller bearing assembly 140. At least one roller element, such as a plurality of rollers 149, is movably positioned between inner race 142 and outer race 146. Each roller 149 is in rolling contact with inner groove 144 and outer groove 148 to facilitate relative rotational movement of cone 84 and/or cone 90.

In this embodiment, roller bearing assemblies 130 and 140 facilitate providing rotational support to aft fan assembly 52 such that aft fan assembly 52 can rotate freely with respect to forward fan assembly 50. Accordingly, roller bearing assemblies 130 and 140 facilitate maintaining aft fan assembly 52 in a relatively fixed radial position within counter-rotating fan assembly 16. In alternative embodiments, any suitable bearing assembly known to those skilled in the art and guided by the teachings herein provided can be used for or in addition to bearing assembly 130 and/or bearing assembly 140.

In one embodiment, gearbox 100 is connected to a fixed or stationary component of gas turbine engine 10, such as frame 13 of core turbine engine 12, as shown in FIG. 3. Gearbox input 104 is rotatably coupled to second drive shaft 34 through drive shaft extension 112 that is splined to drive shaft 34. Gearbox output 106 is rotatably coupled to aft fan assembly 52 through an output structure 160. A first end of output structure 160 is splined to gearbox output 106 and a second end of output structure 160 is coupled to aft fan forward shaft 168 to facilitate driving aft fan assembly 52.

Referring to FIG. 3, in one embodiment, gas turbine engine assembly 10 includes a spline system 200 for mounting gearbox 100 to counter-rotating fan assembly 16. Gearbox 100 is fixedly or securely coupled to frame 13 of core gas turbine engine 12, for example at gearbox support structure 102. Spline system 200 isolates gearbox 100 from first fan assembly 50 and/or second fan assembly 52 to prevent or limit thrust loads and/or forces exerted on gearbox 100 as a result of counter-rotating fan assembly 16 operation. First fan assembly 50 is rotatably coupled to input 104 such that first fan assembly 50 rotates in a first direction, as indicated by rotational arrow 80 in FIG. 1. Second fan assembly 52 is rotatably coupled to output 106 such that second fan assembly 52 rotates in a second direction, as indicated by rotational arrow 82 in FIG. 1, opposite the first direction.

As shown in FIG. 3, spline system 200 includes a plurality of spline assemblies, such as spline assembly 202, 204, 206 and/or 208. In one embodiment, a first spline assembly 202 couples input 104 to drive shaft extension 112. Drive shaft extension 112 includes a first portion 210 and a second portion 212, as shown in FIG. 3. First spline assembly 202 couples input 104 to first portion 10 and a second spline assembly 204, the same or similar to first spline assembly 202, couples first portion 210 to second portion 212 to rotatably couple input 104 to drive shaft 34. Further, second spline assembly 204 facilitates movement of thrust bearing assembly 110 with respect to gearbox 100 in the axial direction, i.e., along or parallel with longitudinal axis 11 of turbine engine assembly 10.

In one embodiment, spline assembly 204 includes a member forming a plurality of splines positioned about a periphery of the member. The member, connected to second portion 212 of drive shaft extension 112, is positionable within a cavity formed in a cooperating housing, connected to first portion 210, such that the plurality of splines mesh or interfere with slots formed on an inner periphery of the housing to transfer torsional loads and/or forces from second portion 212 to first portion 210 of drive shaft extension 112. Further, the member is positioned within the cooperating housing to facilitate movement of the member within the housing in an axial direction, e.g., along or parallel with longitudinal axis 11, which facilitates axial movement of second portion 212 with respect to first portion 210.

In one particular embodiment, each spline assembly 204, 206 and 208 are the same or similar, as described above with reference to spline assembly 204. A third spline assembly 206 slidably couples output 106 to output structure 160. Third spline assembly 206 facilitates axial movement of aft fan forward shaft 168 with respect to gearbox 100. In one embodiment, a fourth spline assembly 208 slidably couples second portion 212 of drive shaft extension 112 to drive shaft 34. During operation, spline assemblies 202, 204, 206 and/or 208 pass only torsional or torque loads and/or forces to gearbox 100 such that gearbox 100 remains in a substantially fixed position with respect to the frame of low-pressure turbine 14.

In one embodiment, drive shaft extension 112 and/or output structure 160 include at least one flexible arm compensating for a radial deflection of gearbox 100. In a particular embodiment, first portion 210 includes a radially inner portion 230 that is coupled to input 104 through spline assembly 202 and a radially outer portion 232 that is coupled to second portion 212 through spline assembly 204. First portion 210 has a first thickness at or near inner portion 230 and a second thickness at or near outer portion 232, which is less than first thickness. In this particular embodiment, a thickness of first portion 210 gradually decreases from radially inner portion 230 to radially outer portion 232. The second thickness is selected such that first portion 230 will separate from second portion 232, i.e. first portion 210 will break, when first portion 210 is subjected to a determined torsional load and/or force. During operation of engine assembly 10, relatively large radial loads and/or forces may be applied to aft fan assembly 52. To compensate for the relatively large radial loads and/or forces, and to ensure continued engine operation, in one embodiment first portion 210 breaks such that forward fan assembly 50 continues to operate as aft fan assembly 52 freewheels.

During operation, as second drive shaft 34 rotates, second drive shaft 34 causes input 104 to rotate in first rotational direction 80, which subsequently rotates output 106 in opposite second rotational direction 82. Because output structure 160 is coupled to aft fan assembly 52, drive shaft 34 causes aft fan assembly 52 to rotate via gearbox 100 in opposite second direction 82. In one embodiment, gearbox 100 is located within a sump 170 at least partially defined between output structure 160 and structural support member 15 configured to support aft fan assembly 52. During operation, gearbox 100 is at least partially submerged within lubrication fluid contained in sump 170 to continuously lubricate gearbox 100 during engine operation.

The gas turbine engine assembly described herein includes a counter-rotating fan assembly having a geared single rotation low-pressure turbine. The assembly facilitates reducing at least some of the complexities associated with known counter-rotating low-pressure turbines. More specifically, the gas turbine engine assembly described herein includes a front fan that is rotatably coupled to a single rotation low-pressure turbine, and an aft fan and booster assembly that are rotatably coupled together, and driven by, the low-pressure turbine via a gearbox. Moreover, the aft fan assembly and booster assembly are driven at the same speed, which, in one embodiment, is approximately one-half the front fan speed. Additionally, the gas turbine engine assembly described herein is configured such that approximately 40% of power generated by the low-pressure turbine is transmitted through the gearbox to the aft fan assembly to facilitate reducing gear losses. Therefore, in the event of a gearbox failure, the aft fan assembly will cease to rotate. However, the front fan assembly will continue to rotate because the front fan assembly is directly driven by the low-pressure turbine.

The above-described gas turbine engine assembly and methods of assembly the gas turbine engine assembly allows the gearbox to be isolated from axial thrusts generated by the counter-rotating fan assembly and/or the coupled booster compressor. More specifically, a spline system of the present invention facilitates preventing or limiting axial loads developed as a result of thrust loads and/or forces generated by the counter-rotating fan assembly and/or the coupled booster compressor to be transferred to the gearbox. The spline system includes spline assemblies that couple the gearbox to the drive shaft and/or components of the counter-rotating fan assembly. The spline assemblies transfer torsional loads and/or forces to the gearbox but prevent or limit axial loads and/or forces from being transferred to the gearbox. Thus, the gearbox remains substantially fixed with respect to the gas turbine engine assembly frame. As a result, the gearbox is only subjected to torsional loads and/or forces.

Exemplary embodiments of a gas turbine engine assembly and methods of assembly the gas turbine engine assembly are described above in detail. The assembly and method are not limited to the specific embodiments described herein, but rather, components of the assembly and/or steps of the method may be utilized independently and separately from other components and/or steps described herein. Further, the described assembly components and/or the method steps can also be defined in, or used in combination with, other assemblies and/or methods, and are not limited to practice with only the assembly and/or method as described herein.

While the invention has been described in terms of various specific embodiments, those skilled in the art will recognize that the invention can be practiced with modification within the spirit and scope of the claims.

What is claimed is:

1. A method for assembling a gas turbine engine, the method comprising:
   providing a core gas turbine engine at least partially defined by a frame and having a drive shaft rotatable about a longitudinal axis of the core gas turbine engine;
   coupling a low-pressure turbine to a core turbine engine;
   coupling a counter-rotating fan assembly including a first fan assembly and a second fan assembly to the low-pressure turbine;
   coupling a booster compressor to the second fan assembly;
   securely coupling a gearbox to the frame so that the gearbox is circumferentially positioned about the drive shaft;
   rotatably coupling the first fan assembly to an input of the gearbox such that the first fan assembly rotates in a first direction by slidably coupling the input to a first portion of a bearing support structure using a first spline assembly and slidably coupling the first portion to a second portion of the bearing support structure using a second spline assembly; and
   rotatably coupling the second fan assembly to an output of the gearbox such that the second fan assembly rotates in a second direction opposite the first direction.

2. A method in accordance with claim 1 further comprising isolating the gearbox from axial loads generated by at least one of the first fan assembly, the second fan assembly and the booster compressor.

3. A method in accordance with claim 1 wherein rotatably coupling the second fan assembly to an output of the gearbox further comprises slidably coupling the output to an output structure using a third spline assembly.

4. A method in accordance with claim 1 further comprising rotating the first fan assembly at a first rotational speed and rotating the second fan assembly at a second rotational speed different than the first rotational speed.

5. A method in accordance with claim 1 further comprising rotating the first fan assembly at a first rotational speed and rotating the second fan assembly at a second rotational speed different than the first rotational speed.

6. A method in accordance with claim 1 further comprising rotating the booster compressor at a rotational speed substantially equal to a rotational speed at which the second fan assembly rotates.

7. A spline system for operatively coupling a gearbox to a counter-rotating fan assembly, said spline system comprising:

a first spline assembly coupling an input of said gearbox to a bearing support structure;
a second spline assembly slidably coupling a first portion of said bearing support structure to a second portion of said bearing support structure; and
a third spline assembly slidably coupling an output of said gearbox to an output structure, said spline system isolating said gearbox from axial loads generated by said counter-rotating fan assembly.

8. A spline system in accordance with claim 7 wherein said second spline assembly facilitates axial movement of a first bearing assembly with respect to said gearbox.

9. A spline system in accordance with claim 7 wherein said second spline assembly rotatably couples said input to a drive shaft rotatable about a longitudinal axis of a core gas turbine engine.

10. A spline system in accordance with claim 7 wherein said third spline assembly provides axial movement of an aft fan forward shaft with respect to said gearbox, said aft fan forward shaft coupled to said output structure to facilitate driving an aft fan assembly of said counter-rotating fan assembly.

11. A spline system in accordance with claim 7 wherein at least one of said bearing support structure and said output structure includes at least one flexible arm compensating for a radial deflection of said gearbox 12. A spline system in accordance with claim 7 wherein said counter-rotating fan assembly further comprises:
a first fan assembly rotatably coupled to said input, said first fan assembly rotating in a first direction; and
a second fan assembly rotatably coupled to said output, said second fan assembly rotating in a second direction opposite said first direction.

13. A turbine engine assembly comprising:
a core turbine engine at least partially defined by a frame and having a drive shaft rotatable about a longitudinal axis of said core turbine engine;
a low-pressure turbine coupled to said core turbine engine;
a gearbox securely coupling with respect to said low-pressure turbine;
a first fan assembly coupled to an input of said gearbox, said first fan assembly rotatable in a first rotational direction;
a second fan assembly coupled to an output of said gearbox, said second fan assembly rotatable in a second rotational direction opposite said first direction; and
a spline system isolating said gearbox from axial loads generated by at least one of said first fan assembly and said second fan assembly.

14. A turbine engine assembly in accordance with claim 13 wherein said spline system rotatably couples said input to said drive shaft.

15. A turbine engine assembly in accordance with claim 13 wherein said spline system further comprises:
a first spline assembly slidably coupling said first fan assembly to said input; and a second spline assembly slidably coupling said second fan assembly to said output.

16. A turbine engine assembly in accordance with claim 15 wherein said spline system further comprises a third spline assembly slidably coupling a first portion of a bearing support structure to a second portion of said bearing support structure.

17. A turbine engine assembly in accordance with claim 16 wherein said third spline assembly couples said input to a first bearing assembly mounted to said bearing support structure.

18. A turbine engine assembly in accordance with claim 16 wherein said third spline assembly facilitates axial movement of a first bearing assembly with respect to said gearbox.

19. A turbine engine assembly in accordance with claim 15 wherein said second spline assembly facilitates axial movement of said second fan assembly with respect to said gearbox.

* * * * *